(12) United States Patent
Feli (10) Patent No.: US 6,748,239 B1
(45) Date of Patent: Jun. 8, 2004

(54) METHODS AND SYSTEMS FOR COMMUNICATING SERVICE CODES OVER A PSTN USING SINGLE STAGE DIALING

(75) Inventor: Evin Feli, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/452,650

(22) Filed: Dec. 1, 1999

(51) Int. Cl.[7] .............................. H04B 1/38; H04M 3/42
(52) U.S. Cl. .................. 455/557; 455/560; 455/3.01; 455/445; 379/207.11; 379/220.01
(58) Field of Search ................................ 455/557, 445, 455/553, 3.01; 379/207.11, 220.01

(56) References Cited

U.S. PATENT DOCUMENTS

| | | | | |
|---|---|---|---|---|
| 5,752,199 A | | 5/1998 | Scott ........................... | 455/557 |
| 6,014,556 A | * | 1/2000 | Bhatia et al. ................ | 455/404 |
| 6,134,433 A | * | 10/2000 | Joong et al. .................. | 455/417 |
| 6,169,895 B1 | * | 1/2001 | Buhrmann et al. .......... | 455/423 |
| 6,195,547 B1 | * | 2/2001 | Corriveau et al. ........... | 455/419 |
| 6,212,377 B1 | * | 4/2001 | Dufour et al. ................ | 455/426 |
| 6,236,646 B1 | * | 5/2001 | Beming et al. .............. | 370/335 |
| 6,295,455 B1 | * | 9/2001 | Fischer et al. ............... | 455/456 |
| 6,301,234 B1 | * | 10/2001 | Lee .............................. | 370/331 |
| 6,363,258 B1 | * | 3/2002 | Schmidt et al. .............. | 455/514 |
| 6,385,178 B1 | * | 5/2002 | Palviainen ................... | 370/328 |

FOREIGN PATENT DOCUMENTS

| | | |
|---|---|---|
| WO | WO 94/05114 | 3/1994 |
| WO | WO 94/15433 | 7/1994 |
| WO | WO 97/23087 | 6/1997 |
| WO | WO 98/52368 | 11/1998 |
| WO | WO 99/49677 | 9/1999 |

OTHER PUBLICATIONS

Copy of International Search Report for PCT/US00/27691.

* cited by examiner

*Primary Examiner*—Vivian Chin
*Assistant Examiner*—Eugene Yun
(74) *Attorney, Agent, or Firm*—Myers Bigel Sibley & Sajovec (57) ABSTRACT

Methods, systems and mobile switching centers are provided that communicate a service code designation over a public switched telephone network without requiring two stage dialing. A received service code, for example a request for facsimile transmission services, is converted by the mobile switching center receiving the request to a pilot number. Pilot numbers are coherently (uniquely) associated with each of the possible service codes supported by the communication protocol (such as IS-136) but are in a form which, unlike the service codes, may be transmitted over the PSTN. The conversion may be provided, for example, by a look up table maintained by the mobile switching center. On the destination end, the receiving wireless network mobile switching center may then convert the pilot number to a service code and establish a connection supporting the requested service to the destination device. Accordingly, the wireless device providing the service code may request services for a communication including establishment of a communication channel including the PSTN in the same manner as where the service is provided entirely by wireless networks which support communication of the service codes.

25 Claims, 5 Drawing Sheets

METHODS AND SYSTEMS FOR COMMUNICATING SERVICE CODES OVER A PSTN USING SINGLE STAGE DIALING

BACKGROUND OF THE INVENTION

The present invention relates to communications methods and apparatus, and more particularly, to methods and apparatus for communicating facsimiles and data. Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

Figure 1:
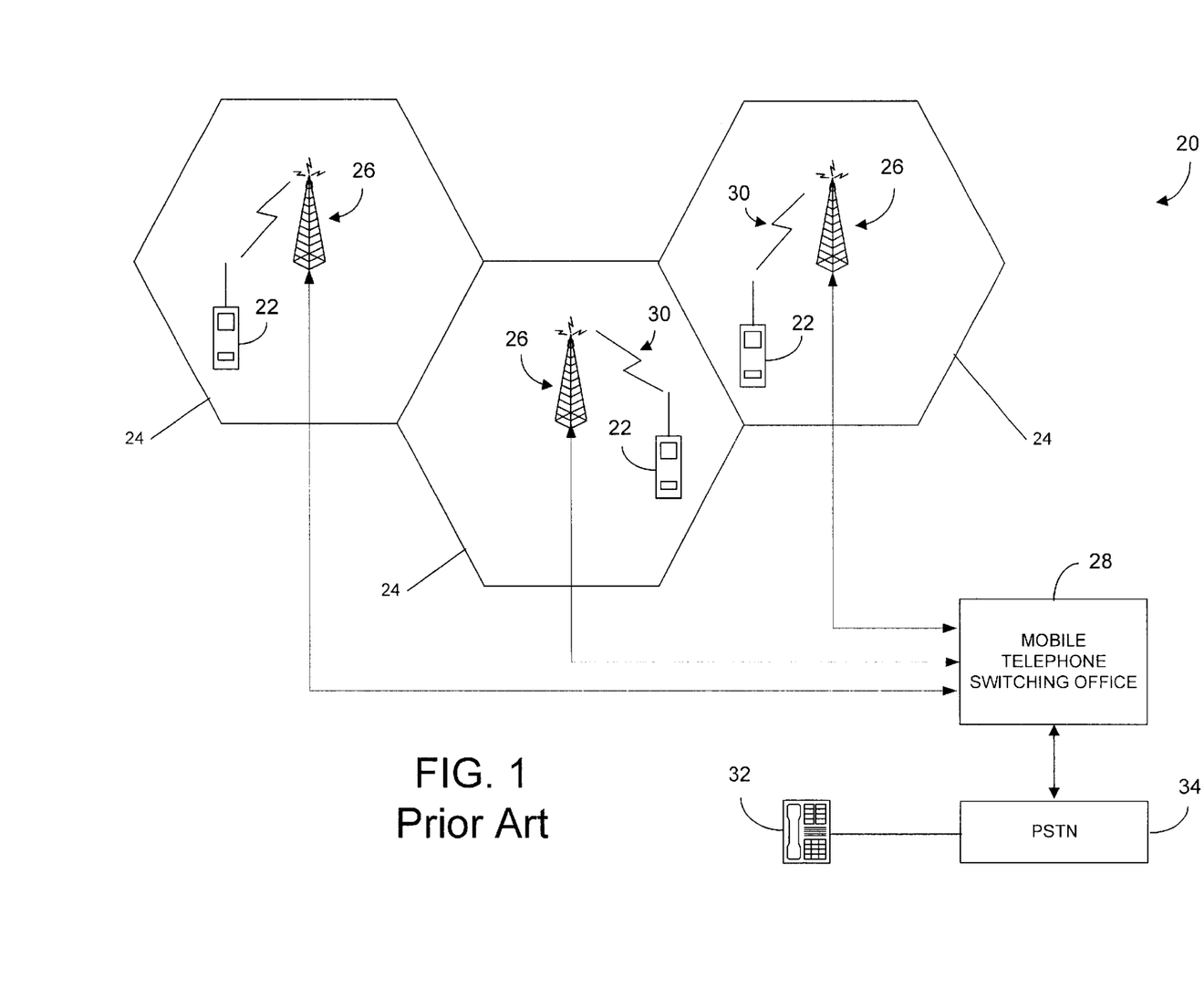
FIG. 1 is a schematic diagram illustrating a conventional terrestrial cellular communications system.

FIG. 1 illustrates a typical terrestrial cellular radiotelephone communication system 20. The cellular radiotelephone system 20 may include one or more radiotelephones (mobile terminals) 22, communicating with a plurality of cells 24 served by base stations 26 and a mobile switching center or mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 or another wireless communication network through a public switched telephone network (PSTN) 34. The function of a base station 26 is to handle radio communication between a cell 24 and mobile terminals 22. In this capacity, a base station 26 functions as a relay station for data and voice signals.

Recently, wireless communications systems have seen an increasing demand for services other than voice, including facsimile and data transmission associated with features such as internet access. Each of these services typically has different performance requirements. For example, facsimile systems are widely used to transmit images, typically of documents, from one location to another. Conventionally, a document is scanned by a "fax machine" to convert it into facsimile data which is then transmitted over a communications channel, typically a voice channel on the PSTN. The document is then reconstructed into hard copy from the transmitted facsimile data by a similar facsimile machine located at the other end of the communications channel.

Standard communications protocols have been developed for transmission of facsimile data. Older analog protocols, such as CCITT Group 1 and Group 2, are now generally obsolete. The digital CCITT Group 3 protocol, widely used by conventional office and home facsimile machines, uses digital modems transmitting digital facsimile data at speeds up to 9600 baud over conventional PSTN telephone lines. The Group 3 protocol includes handshaking and signal quality evaluation features which enable facsimile machines to step down the communication baud rate if the communications channel exhibits poor quality. A CCITT Group 4 protocol has also been established to provide less error-prone communication between facsimile machines over public data networks other than the PSTN.

Because of the increased mobility it offers, cellular radiotelephone technology is increasingly supplanting or being used in addition to the PSTN for many facsimile and data communications applications. Mobile cellular radiotelephones are now a common sight in businesses, home, and automotive environments. Personal computers have also been adapted for use with cellular radiotelephone communications systems, exchanging the wireline modem for a similar device acting over a cellular radiotelephone voice or data channel. In addition, wireless terminal devices have been introduced, referred to as Single Line Terminals (SLT), which provide an RJ-type interface typically associated with a PSTN to the user while utilizing a wireless communication link to the destination device for a call or, alternatively, to a PSTN which services the destination device.

One obstacle to implementation of facsimile communications over cellular radiotelephone communications systems is the generally lower bandwidth, lower signal quality, and higher communications costs which may be associated with cellular radiotelephone channels in comparison to conventional PSTN channels. One approach to providing more reliable radio transmission of facsimile data using packet data protocols with checking and retransmission features is described in U.S. Pat. No. 5,282,238 to Berland. An approach to sending faxes over analog cellular networks is described in U.S. Pat. No. 5,752,199 to Scott. Each of these approaches proposes ways to improve performance of facsimile transmission when a wireless channel is provided for this purpose.

The IS-136 communication standard, which provides for both analog and digital communication support, specifically supports Group 3 type facsimile transmissions. Under the IS-136 standard, a mobile terminal requesting communication access typically provides the communication network a service code. The service code may, for example, request analog speech, digital speech, analog or digital speech with a specified preference, asynchronous data or Group 3 type facsimile services from the IS-136 network. On receipt of a Group 3 facsimile service code, under the IS-136 standard, the communication system determines if a digital traffic channel is available.

Unfortunately, the PSTN in most locations does not support the transmission of a service code. Therefore, a problem is encountered with transmissions of data or facsimiles where the transmission path includes use of the PSTN to couple two wireless communication networks using service codes, such as two IS-136 systems. One proposed solution utilizes two stage dialing to provide a pilot number for transmission over the PSTN to communicate service code information. An example of two stage dialing is illustrated in FIG. 2.

Figure 2:
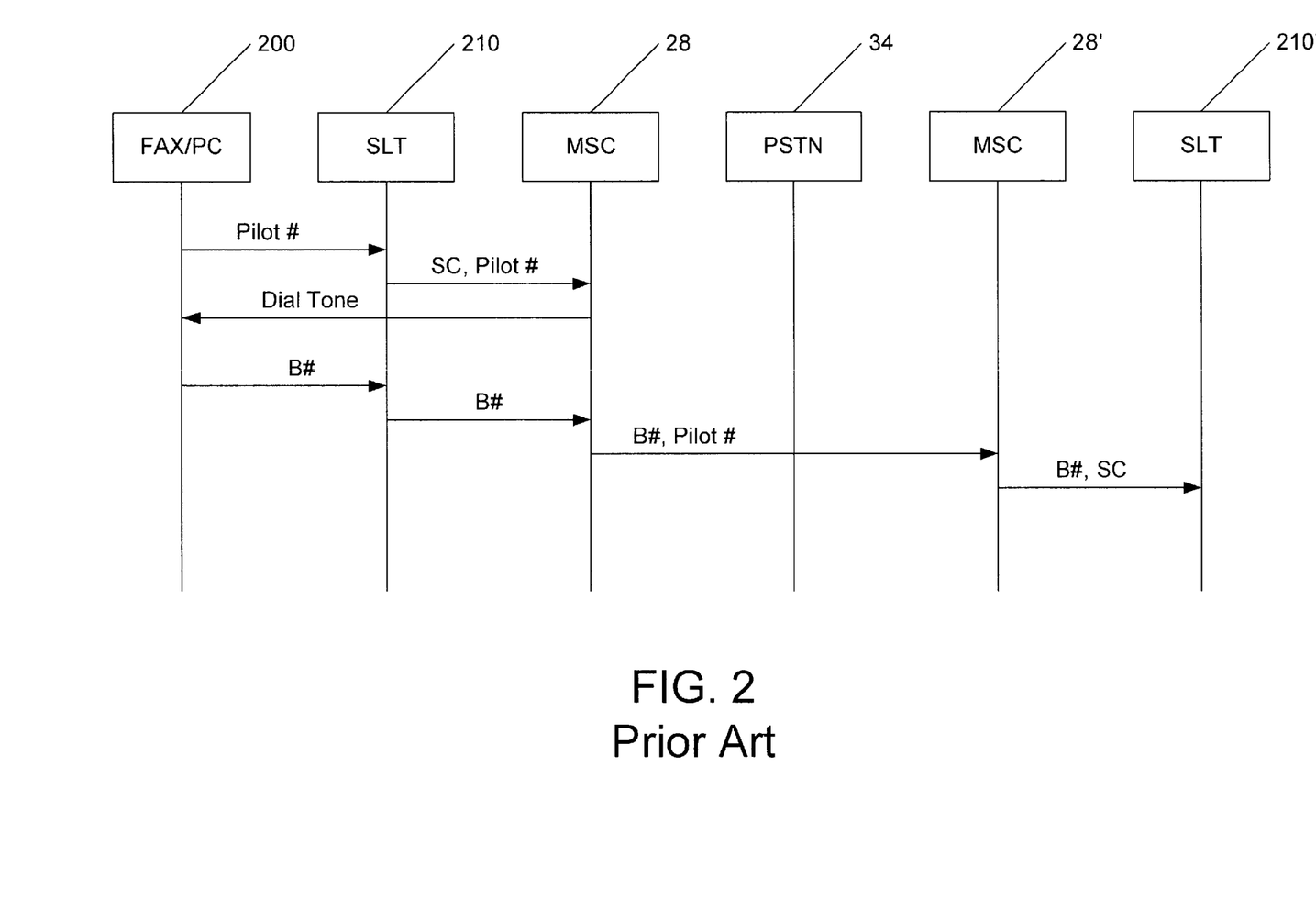
FIG. 2 is a schematic diagram illustrating conventional two stage dialing for a facsimile or data transmission.

As shown in the schematic illustration of FIG. 2, two stage dialing is provided for call setup because PSTN signaling typically does not support delivery of the service code which is, for example, on the IS-136 protocol, mandatory. Accordingly, the source device attempting to establish a channel to communicate data or a facsimile image 200 first transmits a pilot number to a wireless device such as the SLT 210. The pilot number carries service code information for the over air protocol, (such as IS-136,) as it is coherently related to the available service codes (i.e., a one to one unique correspondence is provided between pilot numbers and service codes supported by the over air protocol).

The single line terminal 210 receives the pilot number, determines the appropriate service code for the over air protocol and provides both the pilot number and the service code to the mobile switching center 28. The mobile switching center 28 provides a dial tone to the FAX/PC device 200 through the SLT 210. In other words, after receipt of the service code and pilot number from the SLT 210 over a control channel, such as a random access channel (RACH), the mobile switching center 28 allocates a traffic channel to the SLT 210 for use by the FAX/PC device 200.

On receipt of the dial tone, the FAX/PC device 200 transmits the destination number (also referred to as the B number (B#)) to the SLT 210 which in turn passes the destination number on to the mobile switching center 28 utilizing the assigned traffic channel.

Having received both the destination number and the pilot number, the mobile switching center 28 routes both the destination number (B#) and the pilot number through the PSTN 34 to the mobile switching center 28' serving the remote wireless network associated with the destination number. The remote mobile switching center 28' in turn passes the destination number and service code to the remote SLT 210' associated with the destination number. Note that, once the service code associated with a facsimile transmission service is received by the mobile switching center 28, an additional protocol associated with the requested service, such as facsimile transmission, may be implemented and control subsequent transmissions. For example, in the case of a facsimile transmission as supported by the IS-136 over air protocol, once the associated service code is received, subsequent communications over the traffic channel will occur pursuant to the IS-135 protocol as well as the IS-136 over air protocol.

The additional user interaction required by two stage dialing is, however, generally undesirable for the user. Accordingly, there is a need for wireless communications systems and methods whereby multiple services with differing performance requirements can utilize a common infrastructure in an effective and efficient manner which is transparent to the user.

SUMMARY OF THE INVENTION

According to the present invention, methods, systems and mobile switching centers are provided that communicate a service code designation over a public switched telephone network without requiring two stage dialing. A received service code, for example, a request for facsimile transmission services, is converted by the mobile switching center receiving the request to a pilot number. Pilot numbers are coherently (uniquely) associated with each of the possible service codes supported by the communication protocol (such as IS-136) but are in a form which, unlike the service codes, may be transmitted over the PSTN. The conversion may be provided, for example, by a look up table maintained by the mobile switching center. On the destination end, the receiving wireless network mobile switching center may then convert the pilot number to a service code and establish a connection supporting the requested service to the destination device. Accordingly, the wireless device providing the service code may request services for a communication including establishment of a communication channel including the PSTN in the same manner as where the service is provided entirely by wireless networks which support communication of the service codes.

In one embodiment of the present invention, a method is provided for communicating a service code designation over a public switched telephone network (PSTN). A service code and a destination number are received from a wireless terminal on a control channel of a wireless communication network. The service code is converted to a pilot number which may be transmitted over the PSTN. In one embodiment, the service code is converted by looking up the pilot code in a cross reference memory that includes a unique pilot code associated with each of a plurality of service codes. The pilot number and the destination number are then communicated over the PSTN to a destination wireless communication network to provide the service code designation to the destination wireless communication network.

In another embodiment, the wireless communication network and the destination wireless communication network are IS-136 networks and the received service code requests at least one of facsimile or data services. In a further embodiment, the wireless terminal is a single line terminal (SLT) and the destination number is received by the SLT from either a facsimile device or a data device coupled to the SLT. In a further embodiment, the control channel over which the destination number and service code are received is a random access channel (RACH).

In a further embodiment of the present invention, the pilot number and the destination number are received over the PSTN at the destination wireless communication network. The service code is determined from the pilot number at the destination wireless communication network. A communication connection is then established supporting either facsimile or data services to a device associated with the destination number over the destination wireless communication network responsive to the determined service code.

In a further aspect of the present invention, a mobile switching center (MSC) is provided. The MSC includes a communication interface that communicates with a wireless device. A voice circuit coupled to the communication interface controls voice communication with the wireless device. An interworking circuit coupled to the communication interface controls at least one of data and facsimile communication with the wireless device. A PSTN interface couples the mobile switching center to a public switched telephone network (PSTN). In addition, the MSC includes a service code circuit coupled to the interworking circuit that converts a service code received from the wireless device to a pilot number which may be transmitted over the PSTN.

As will further be appreciated by those of skill in the art, while described above primarily with reference to method aspects, the present invention may also be embodied as systems.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of a hardware embodiment, a software embodiment or an embodiment combining software and hardware aspects.

Figure 3:
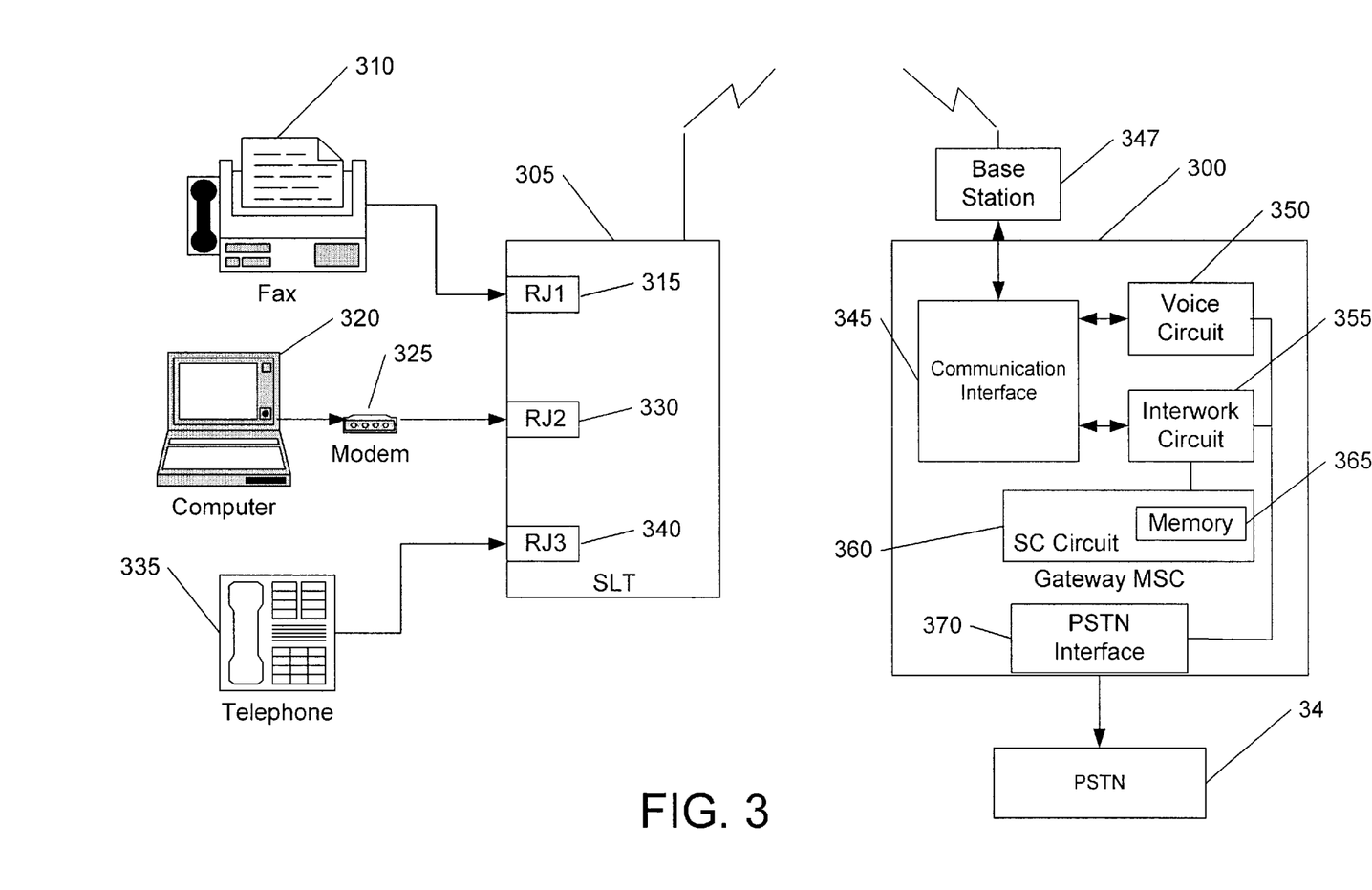
FIG. 3 is a block diagram of a mobile switching center according to an embodiment of the present invention supporting a SLT.

The present invention will now be further described with reference to the block diagram illustration of FIG. 3. As shown in FIG. 3, a gateway mobile switching center 300 in accordance with an embodiment of the present invention supports a wireless communication connection to the SLT 305. The SLT 305 is a wireless device providing communication support services to a variety of user devices. More particularly, the SLT 305 includes three RJ-type input ports 315, 330, 340 for use by a user. The first port, RJ1 315, is designated a facsimile input port and is connected to a fax device 310. The second port, RJ2 330, is designated a data port and connects through a modem 325 to a computer 320. Finally, the third input port, RJ3 340, is coupled to a telephone 335. The use of three separate ports provides the SLT 305 the ability to determine the type of service requested responsive to receipt of an off hook signal based upon the port receiving the off hook signal. However, it is to be understood that other means may be utilized by the SLT 305 to determine a service type requested in which case a single input port may be provided for all of the different device types.

The mobile switching center 300 includes a communication interface 345 that supports communications over a wireless communication channel with the SLT 305 or other wireless device through a base station 347 or other means for receiving and transmitting signals over a wireless communication channel. In addition, the mobile switching center 300 includes a voice circuit 350 and an interworking circuit 355 both coupled to the communication interface 345. The voice circuit 350 controls voice communication with the wireless device 305 while the interworking circuit 355 controls data and facsimile communication with the wireless device 305.

As shown in the embodiment of FIG. 3, the mobile switching center 300 further includes a service code circuit 360 coupled to the interworking circuit 355 that converts a service code received from the SLT 305 to a pilot number having a form which may be transmitted over the PSTN 34. The service code circuit 360 further includes a memory 365 which contains a unique pilot code associated with each of a plurality of service codes specified by the over air protocol controlling communications from the SLT 305 (for example, IS-136). Finally, the mobile switching center 300 includes a PSTN interface 370 that couples the mobile switching center 300 to the PSTN 34.

As will be appreciated by those of skill in this art, the above-described aspects of the present invention in FIG. 3 may be provided by hardware, software, or a combination of the above. While various components of mobile switching center 300 have been illustrated in FIG. 3, in part, as discrete elements, they may, in practice, be implemented by a micro controller including input and output ports and running software code, by custom or hybrid chips, by discrete components or by a combination of the above. For example, interworking circuit 355 and voice support circuit 350 may be implemented in part as code executing on a processor.

Figure 4:
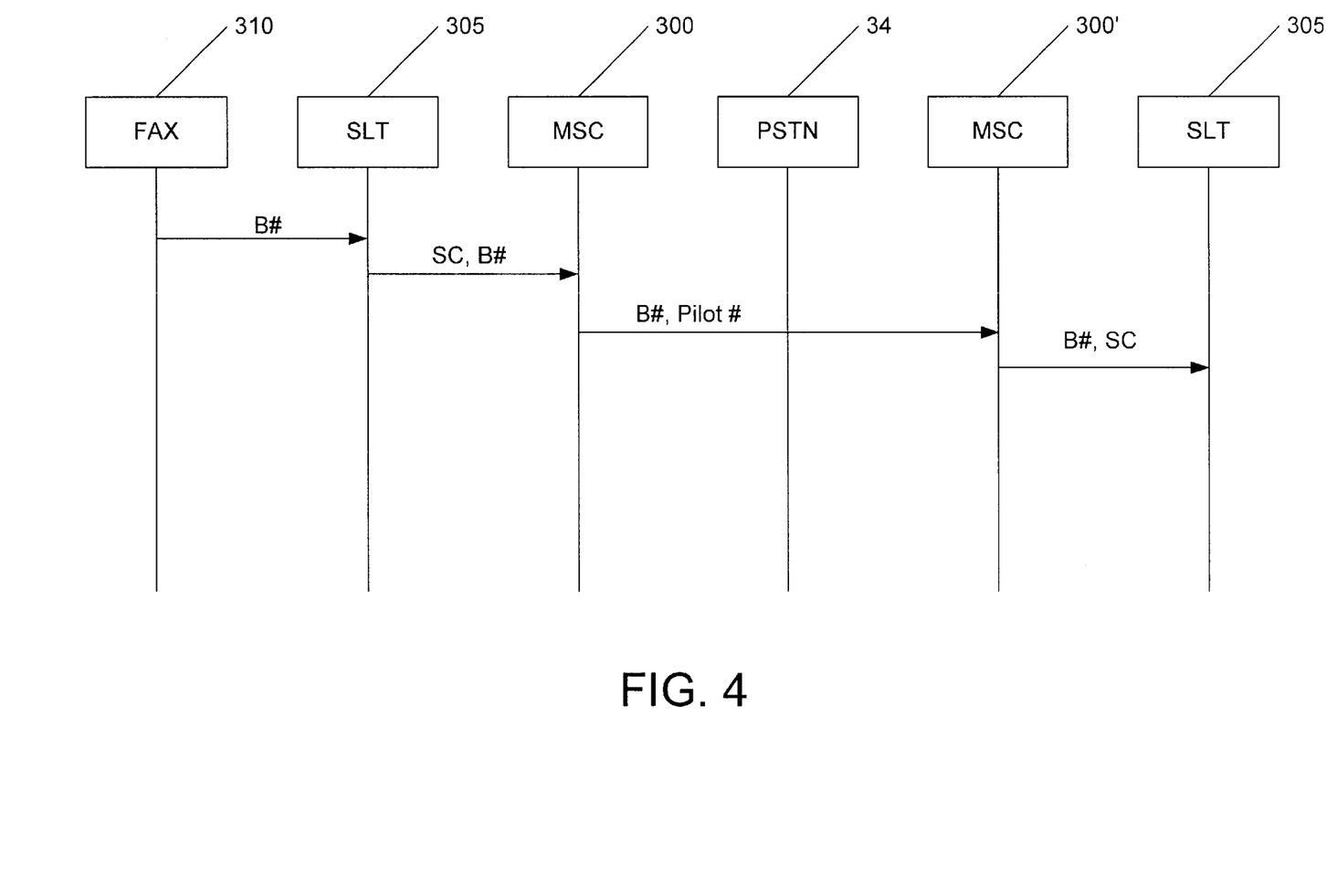
FIG. 4 is a schematic diagram illustrating communication of a service code designation over a PSTN according to an embodiment of the present invention.

Operations according to an embodiment of the present invention will now be described with reference to the schematic illustration of FIG. 4. As shown in FIG. 4, the user dials the destination number (B#) on the facsimile device 310. The SLT 305 then transmits the B number along with the proper service code over a wireless control channel to the mobile switching center 300. The SLT 305 may, for example, determine the appropriate service code based upon the port number 315, 330, 340 through which the destination number is received. For example, the SLT 305 may treat a destination number received through port RJ1 315 as requiring a facsimile services service code.

The mobile switching center 300 converts the received service code to a pilot number that may be transmitted over the PSTN 34 and then sends the destination number and the pilot number through the PSTN 34 to the remote mobile switching center 300' associated with the destination number. The remote mobile switching center 300' in turn forwards the destination number and service code to the remote SLT 305' associated with the destination number.

Operations of the present invention will now be described with respect to the flowchart illustration of FIG. 5. It will be understood that each block of the flowchart illustration and the block diagram illustration of FIG. 3, and combinations of blocks in the flowchart illustration and the block diagram illustration of FIG. 3, can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flowchart and block diagram block or blocks.

Accordingly, blocks of the flowchart illustration and the block diagram support combinations of means for performing the specified functions, combinations of steps for performing the specified functions and program instruction means for performing the specified functions. It will also be understood that each block of the flowchart illustration and block diagram, and combinations of blocks in the flowchart illustration and block diagram, can be implemented by special purpose hardware-based systems which perform the specified functions or steps, or combinations of special purpose hardware and computer instructions.

Figure 5:
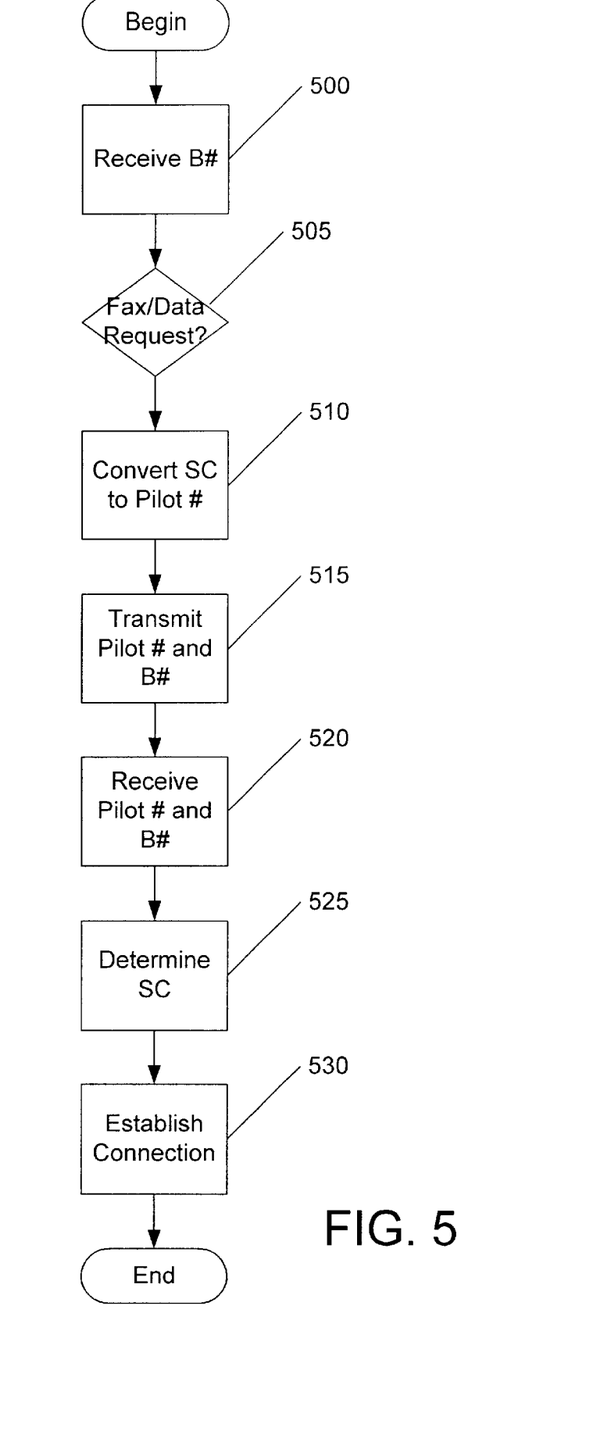
FIG. 5 is a flowchart illustrating operations for an embodiment of the present invention.

As shown in FIG. 5, operations begin at block 500 when the mobile switching center 300 receives a service code and destination number (B#) from a wireless terminal such as the SLT 305 on a control channel of the wireless communication network. The wireless communication network may be an IS-136 network and the service code and destination number may be received from the SLT 305 on a control channel of the IS-136 wireless communication network such as the random access channel (RACH). The SLT 305 in turn may have received the destination number from a facsimile device 310, a computer device 320 or a telephone 325.

Where the received service code requests a service associated with facsimile or data communication services (block 505), the mobile switching center 300 converts the received service code to a pilot number which may be transmitted over the PSTN (block 510). The mobile switching center 300 then communicates the pilot number and the destination number over the PSTN 34 to a destination wireless communication network device 300' so as to provide the service code designation for the connection to the destination wireless communication network. (block 515). In a preferred embodiment, the mobile switching center 300 converts the service code to a pilot number at block 510 by looking up the pilot code in a cross reference memory 365 that includes a unique pilot code associated with each of a plurality of service codes supported by the over air protocol of the wireless communication networks.

Operations continue at the destination wireless communication network when the pilot number and destination number communicated through the PSTN 34 are received at the destination mobile switching center 300' (block 520). The destination mobile switching center 300' then determines the service code from the pilot number (block 525). The appropriate destination number and service code are then routed to the associated SLT 305' to establish a communication connection supporting the requested service responsive to the determined service code (block 530). Accordingly, for example, a facsimile transmission from the fax device 310 may be transmitted through the SLT 305 over a wireless communication channel to the mobile switching center 300, routed through the PSTN 34 to the associated destination mobile switching center 300' and again over a wireless communication leg between the mobile switching center 300' and the destination SLT 305' while supporting the features associated with the service code as specified by the over air protocol utilized between the mobile switching center 300 and the SLT 305 as well as between the mobile switching center 300' and the SLT 305'. Therefore, in accordance with the present invention, a user may beneficially obtain service code supported features over a connection which includes at least a portion passing through the PSTN 34 in a manner which is transparent to the user as the mobile switching center 300 generates the pilot number necessary to utilize the link through the PSTN 34.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for communicating a service code designation over a public switched telephone network (PSTN) comprising the steps of:
   receiving a service code and a destination number from a wireless terminal on a control channel of a wireless communication network;
   converting the service code to a pilot number; and
   communicating the pilot number and the destination number over the PSTN to a destination wireless communication network to provide the service code designation to the destination wireless communication network.

2. The method of claim 1 wherein the wireless communication network and the destination wireless communication network are IS-136 networks and wherein the step of receiving a service code and a destination number from a wireless terminal on a control channel of a wireless communication network further comprises the step of receiving a service code that requests at least one of facsimile or data services.

3. The method of claim 2 wherein the wireless terminal is a single line terminal (SLT).

4. The method of claim 3 wherein the step of receiving a service code and a destination number from a wireless terminal on a control channel of a wireless communication network is preceded by the step of receiving at the SLT the destination number from at least one of a facsimile device or a data device coupled to the SLT.

5. The method of claim 2 wherein the control channel is a random access channel (RACH).

6. The method of claim 2 wherein the step of converting the service code to a pilot number further comprises the step of looking up the pilot code in a cross reference memory that includes a unique pilot code associated with each of a plurality of service codes.

7. The method of claim 2 wherein the step of communicating the pilot number and the destination number over the PSTN to a destination wireless communication network to provide the service code designation to the destination wireless communication network is followed by the steps of:
   receiving the pilot number and the destination number over the PSTN at the destination wireless communication network;
   determining the service code from the pilot number at the destination wireless communication network; and
   establishing a communication connection supporting the at least one of facsimile or data services to a device associated with the destination number over the destination wireless communication network responsive to the determined service code.

8. The method of claim 1 wherein the step of receiving a service code and a destination number comprises receiving the service code and the destination number together.

9. The method of claim 1 wherein the service code comprises information for an over air protocol of the destination wireless communication network.

10. The method of claim 9 wherein the service code comprises a facsimile protocol designation.

11. A mobile switching center comprising:
   a communication interface that communicates with a wireless device;
   a voice circuit coupled to the communication interface that controls voice communication with the wireless device; and
   an interworking circuit coupled to the communication interface that controls at least one of data and facsimile communication with the wireless device;
   a public switched telephone network (PSTN) interface that couples the mobile switching center to a PSTN; and
   a service code circuit that converts a service code received from the wireless device to a pilot number; wherein the communication interface is configured to communicate the pilot number and a destination number over the PSTN to a destination wireless communication network to provide a service code designation to the destination wireless communication network.

12. The mobile switching center of claim 11 wherein the voice circuit and the interworking circuit are configured to support IS-136 standard communications.

13. The mobile switching center of claim 12 wherein the wireless device is a single line terminal (SLT).

14. The mobile switching center of claim 11 wherein the interworking circuit is configured to receive the service code from the wireless device on a random access channel (RACH).

15. The mobile switching center of claim 11 wherein the service code circuit further comprises a memory containing a unique pilot code associated with each of a plurality of service codes.

16. A system for communicating a service code designation over a public switched telephone network (PSTN) comprising:

means for receiving a service code and a destination number from a wireless terminal on a control channel of a wireless communication network;

means for converting the service code to a pilot number; and means for communicating the pilot number and the destination number over the PSTN to a destination wireless communication network to provide the service code designation to the destination wireless communication network.

17. The system of claim 16 wherein the wireless communication network and the destination wireless communication network are IS-136 networks and wherein the means for receiving a service code and a destination number from a wireless terminal on a control channel of a wireless communication network further comprises means for receiving a service code that requests at least one of facsimile or data services.

18. The system of claim 17 wherein the wireless terminal is a single line terminal (SLT).

19. The system of claim 18 further comprising means for receiving at the SLT the destination number from at least one of a facsimile device or a data device coupled to the SLT.

20. The system of claim 17 wherein the control channel is a random access channel (RACH).

21. The system of claim 17 wherein the means for converting the service code to a pilot number further comprises means for looking up the pilot code in a cross reference memory that includes a unique pilot code associated with each of a plurality of service codes.

22. The system of claim 17 further comprising:

means for receiving the pilot number and the destination number over the PSTN at the destination wireless communication network;

means for determining the service code from the pilot number at the destination wireless communication network; and means for establishing a communication connection supporting the at least one of facsimile or data services to a device associated with the destination number over the destination wireless communication network responsive to the determined service code.

23. The system of claim 16 wherein the means for receiving a service code and a destination number comprises means for receiving the service code and the destination number together.

24. The system of claim 16 wherein the service code comprises information for an over air protocol of the destination wireless communication network.

25. The system of claim 24 wherein the service code comprises a facsimile protocol designation.

* * * * *